United States Patent [19]

Dieck et al.

[11] 4,107,146
[45] Aug. 15, 1978

[54] CURABLE ARYLOXYPHOSPHAZENE POLYMERS

[75] Inventors: Ronald L. Dieck; Alan B. Magnusson; Edwin J. Quinn, all of Lancaster, Pa.

[73] Assignee: Armstrong Cork Company, Lancaster, Pa.

[21] Appl. No.: 768,603

[22] Filed: Feb. 14, 1977

[51] Int. Cl.² .............................. C08G 79/04; C08J 9/10
[52] U.S. Cl. .................................. 528/168; 260/3; 260/30.8 DS; 260/32.6 N; 260/33.6 F; 260/33.6 R; 260/DIG. 24; 528/399
[58] Field of Search ............... 260/2.5 R, 47 P, 2 P, 260/48

[56] References Cited

U.S. PATENT DOCUMENTS

| | | | |
|---|---|---|---|
| 3,994,838 | 11/1976 | Thompson et al. | 260/2.5 R |
| 4,026,838 | 5/1977 | Dieck et al. | 260/48 |
| 4,055,545 | 10/1977 | Dieck et al. | 260/48 |

OTHER PUBLICATIONS

"Vulcanization of Elastomers" by Alliger et al., Rheinhold Publishing Corp., 1964, pp. 195-207.

Primary Examiner—Morton Foelak
Attorney, Agent, or Firm—Richard J. Hammond

[57] ABSTRACT

Polymers comprising randomly repeating units of the general formula

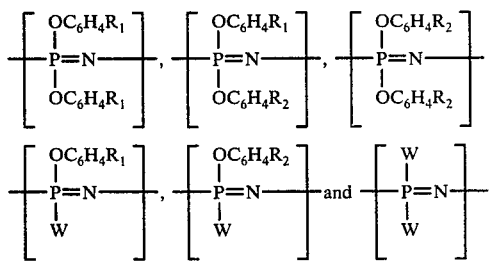

wherein $R_1$ is linear or branched $C_1$-$C_{10}$ alkoxy, $R_2$ is linear or branched $C_1$-$C_{10}$ alkyl, hydrogen or halogen, and W is $C_2$ to $C_{10}$ alkenyl-substituted aryloxy. These novel polymers are elastomers and may be used to form flexible and semirigid foams and coatings. They display good fire retardance and low smoke levels.

7 Claims, No Drawings

CURABLE ARYLOXYPHOSPHAZENE POLYMERS

BACKGROUND OF THE INVENTION

1. Field of the Invention

This invention relates to elastomeric poly(aryloxyphosphazene) polymers to flexible and rigid foams produced from said polymers and to a process for preparing the polymers, foams and foam coatings. The polymers of this invention are soluble in tetrahydrofuran, benzene, and dimethylformamide, and exhibit excellent flame retardant and foam-forming properties. Foams prepared from the polymers exhibit excellent flame retardant properties and produce low smoke levels when heated in an open flame. Foams prepared from such materials provide protective coatings which are stable to heating.

2. Description of the Prior Art

The preparation of poly(aryloxyphosphazene) polymers has been disclosed in U.S. Pat. No. 3,856,712, Reynard et al; U.S. Pat. No. 3,856,713, Rose et al; and U.S. Pat. No. 3,883,451, Reynard et al. However, in contrast to the polymers of the present invention, the polymers described in the first-mentioned Reynard et al patent are copolymers that contain selected quantities of both aryloxy and alkoxy side chains in the copolymer backbone, whereas the polymers described in the latter-mentioned Reynard el al patent are copolymers characterized by the presence of halogen-substituted aryl side chains in the copolymer backbone. The copolymers disclosed in the above-mentioned Rose el al patent further differ from the polymers of the present invention since they are characterized by the presence of only alkyl substituted aryloxy and unsubstituted aryloxy side chains.

Curable phosphazene polymers are disclosed in U.S. Pat. No. 3,888,799, Rose et al, and U.S. Pat. No. 3,702,833, Rose et al, where the cure sites are unsaturated groups capable of crosslinking. However, these two patents disclose copolymers having a high percentage of fluorine and are significantly different than the polymers disclosed herein. U.S. Pat. No. 3,948,820, Reynard et al, discloses curable phosphazene polymers in which the curing takes place by reaction of functional groups appended to the phosphorus-nitrogen backbone. U.S. Pat. No. 3,994,838, Thompson et al, discloses polyphosphazene foam vulcanizates in which vulcanization results from crosslinking of an added unsaturated material, the polyphosphazene acting as a non-reactive additive.

Other related art may be found in U.S. Pat. Nos. 3,515,688; 3,700,629; 3,702,833; and 3,856,712; but in each case, the polymers described in these patents differ from the polymers of the present invention in their structure and physical characteristics.

SUMMARY OF THE INVENTION

The poly(aryloxyphosphazene) polymers of the present invention are characterized by the repeating unit

—P=N— which contain aryloxy-substituents on the phosphorus atoms in nonregular fashion and which can be more explicitly represented by the following formulas:

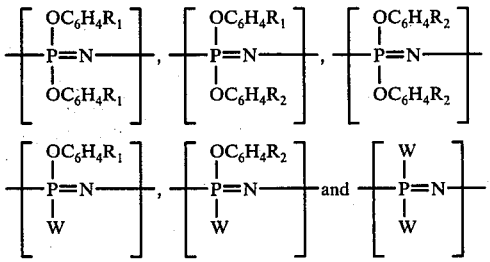

wherein $R_1$ is linear or branched $C_1$–$C_{10}$ alkoxy, $R_2$ is linear or branched $C_1$–$C_{10}$ alkyl, hydrogen or halogen, and W is $C_2$ to $C_{10}$ alkenyl-substituted aryloxy.

It is to be understood that $R_1$ and $R_2$ are different and, as such, may comprise phosphazene copolymers, terpolymers and the like. For example, where $R_1$ is alkoxy and $R_2$ is hydrogen, copolymers result. When $R_2$ is mixed, however, i.e. hydrogen and $C_1$–$C_{10}$ linear or branched alkyl, then terpolymers are produced. Various mixtures of $R_1$ and $R_2$ can be employed herein and such will give a copolymer having as many as 4 or more repeating units, such randomly distributed on the phosphorus-nitrogen backbone.

It is to be further understood that, in the copolymers of this invention, mixtures of different substituent radicals or mixtures of different ortho, meta and para isomers may also be present. Desirably, however, groups which sterically inhibit the reaction to produce the above copolymers should be avoided. Absent the foregoing proviso, the selection of the various $R_1$'s and $R_2$'s will be apparent to anyone skilled in the art based upon this disclosure and that of U.S. patent application Ser. No. 661,862, incorporated herein by reference. For the sake of simplicity, the copolymers of this invention which contain the aforesaid repeating units may be represented by the formula $[NP(OC_6H_4\text{-}R_1)_a(OC_6H_4\text{-}R_2)_b(W)_c]_n$ wherein n is from about 20 to about 2,000 or more and wherein a or b, but not c, can be $\geq 0$, and $a + b + c = 2$.

Examples of W are $OC_6H_4CH=CH_2$, $OC_6H_3(R_3)CH=CH_2$, $OC_6H_3(R_3)CH_2CH=CH_2$, $OC_6H_3(R_3)CH_2CH=CH(R_4)$ and similar groups which contain unsaturation wherein $R_3$ and $R_4$ can be the same or different and are alkenyl, alkoxy, aryloxy, alkyl, aryl, and halogen. These groups normally react at temperatures of about 200°–350° F. However, a judicious selection of different W permits multistage cures that may be desirable from processing or end use considerations. It is also possible to use as W in the above formulas monovalent radicals represented by the formula $—OSi(OR^4)_2R^5$ and other similar radicals which contain one or more reactive groups attached to the silicon atom. The introduction of groups such as W into phosphazene polymers is shown in U.S. Pat. Nos. 3,888,799; 3,702,833; and 3,844,983, which are hereby incorporated by reference.

The above-described polymers may be crosslinked by the use of conventional sulfur-type curing agents. Examples of sulfur-type curing systems include vulcanizing agents such as sulfur, sulfur monochloride, selenium, tellurium, thiuram disulfides, p-quinone dioximes, polysulfide polymers, and alkyl phenol sulfides. The above vulcanizing agents may be used in conjunction with accelerators, such as aldehyde amines, thiocarbamates, thiurams, guanidines and thiazole, as well as accelerator activators, such as zinc oxide or fatty acids, e.g. stearic acid.

In the copolymers, in accordance with the present invention, the ratio of $(a + b):c$ affect the processability, smoke production, glass transition temperatures and a number of other properties of the copolymers. These ratios also affect the copolymer's ability to be foamed and the properties, such as rigidity, of the resulting foams. Accordingly, it is contemplated that copolymers useful in forming the improved copolymers of this invention contain a mole ratio of $a:b$ of at least 1:6 and up to about 6:1, and preferably between 1:4 and 4:1. It is also contemplated that the mole ratio of $c:(a+b)$ will be from 9:10 to 5:100, preferably from 5:10 to 1:100, most preferably from 1:10 to 3:100.

The copolymers of this invention are prepared by a series of reaction steps wherein the first step comprises thermally polymerizing a compound having the formula $(NPCL_2)_3$ by heating such to a temperature and for a length of time ranging from about 200° C. for 48 hours to 300° C. for 30 minutes, preferably in the absence of oxygen, and most preferably in the presence of a vacuum of at least $10^{-1}$ Torr. The product of such thermal polymerization is a mixture of polymers having the formula $(NPCl_2)_n$ wherein n ranges from about 20 to about 2,000.

The second step, the esterification step of this process, comprises treating the mixtures resulting from the thermal polymerization with a mixture of compounds having the formula $M(OC_6H_4-R_1)_x$,
$M(OC_6H_4-R_2)_x$, and
$M(W)_x$ wherein M is lithium, sodium, potassium, magnesium or calcium; x is equal to the valence of the metal M; and $R_1$, $R_2$ and W are as specified above. The polymer $(NPCl_2)_n$ is reacted with the mixture of metal compounds as disclosed above, at a temperature and a length of time ranging from about 25° C. for 7 days to about 200° C. for 3 hours. Normally, the above esterification step is carried out in the presence of a high boiling, substantially anhydrous solvent such as diglyme and the like.

Polymers produced as a result of the esterification step are a mixture of polymers having the formula $[NP(OC_6H_4R_1)_a(OC_6H_4R_2)_b(W)_c]_n$ wherein n, $R_1$, $R_2$, and W are as specified above and wherein a or b, but not c, can be $\geq 0$ and wherein $a + b + c = 2$, and the corresponding metal chloride salt.

The polymeric reaction mixture resulting from this second, or esterification, step is then treated to remove the salt which results from the reaction of chlorine in the polymer mixture with the metal of the alkali or alkaline earth metal compounds. This is most readily accomplished by precipitating the salt and filtering the resulting mixture.

The copolymeric mixture formed from the esterification reaction can be purified by fractionally precipitating the materials in order to separate out the high molecular weight polymer from the low molecular weight polymer and any unreacted starting material. The fractional precipitation of the esterified polymeric mixture generally should be carried out at least twice, preferably at least four times, in order to remove as much of the low molecular weight polymer from the polymer mixture. In some cases, this fractional precipitation step may be eliminated, and the polymeric mixture from the esterification step directly used in the coatings or foams in accordance with other embodiments of the present invention.

The novel polymeric mixtures of this invention, as disclosed above, are soluble in specific organic solvents, such as tetrahydrofuran, benzene, xylene, toluene, dimethylformamide, dimethylsulfoxide, and the like, and can be easily cast into films from solutions by evaporation of the solvent. These polymers are water resistant at room temperature and do not undergo hydrolysis at high temperatures. As such, the polymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate, hydrated silicas, and other resins, without detracting from the scope of the present invention.

Additionally, the blends may be used to prepare foamed products which exhibit excellent fire retardance and which produce low smoke levels, or essentially no smoke when heated in open flame. The foamed produces may be prepared from filled or unfilled formulations using conventional foam techniques with chemical blowing agents, i.e. chemical compounds stable at original room temperature which decompose or interact at elevated temperature to provide a cellular foam. Suitable chemical blowing agents include:

| Blowing Agent | Effective Temperature Range ° C. |
|---|---|
| Azobisisobutyronitrile | 105–120 |
| Azo dicarbonamide (1,1-azobisformamide) | 100–200 |
| Benzenesulfonyl hydrazide | 95–100 |
| N,N'-dinitroso-N,N'-dimethyl terephthalamide | 65–130 |
| Dinitrosopentamethylenetetramine | 130–150 |
| Ammonium carbonate | 58 |
| p,p'-oxybis-(benzenesulfonylhydrazide) | 100–200 |
| Diazo aminobenzene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disulfonylazide | 110–130 |

Typical peroxide curable foam formulations include:

| | |
|---|---|
| Phosphazene polymer | 100 parts |
| Filler (e.g., alumina trihydrate) | 0–100 phr |
| Stabilizer (e.g., magnesium oxide) | 2.5–10 phr |
| Processing aid (e.g., zinc sterate) | 2.5–10 phr |
| Plasticizer resin (e.g., Cumar P-10, coumarone indene resin) | 0–50 phr |
| Blowing agent (e.g., 1,1'-azobisformamide) | 10–50 phr |
| Activator (e.g., oil-treated urea) | 10–40 phr |
| Peroxide curing agent (e.g., 2,5-dimethyl-2,5-di(t-butylperoxy)hexane) | 2.5–10 phr |
| Peroxide curing agent (e.g., benzoyl peroxide) | 2.5–10 phr |
| Cyclophosphazene plasticizer [e.g. $N_3P_3(OC_6H_5)_3(OC_6H_4\text{-}4\text{-}OCH_3)_3$ $N_3P_3(OC_6H_4\text{-}4\text{-}OCH_3)_3(OC_6H_4\text{-}4\text{-}secC_4H_9)_3$] | 0.1–100 phr  0–100 phr |

Typical sulfur curable formulations include:

| | |
|---|---|
| Phosphazene polymer | 100 parts |
| Filler (e.g., alumina trihydrate) | 0–250 phr |
| Stabilizer (e.g., magnesium oxide) | 0–10 phr |
| Processing aid (e.g., zinc stearate) | 2–20 phr |
| Blowing agent (e.g., 1,1'-azobisformamide) | 10–50 phr |
| Activator (e.g., oil-treated urea) | 2–20 phr |
| Vulcanizer (sulfur) | 0.5–5 phr |
| Pigment ($TiO_2$) | 0–10 phr |
| Accelerators | |
| (e.g. zinc dimethyldithiocarbamate) | 0.4–5 phr |
| (e.g. tellurium diethyldithiocarbamate) | 0.2–2 phr |
| (e.g. N,N'-dibutylthiourea) | 0.2–2 phr |
| Cyclophosphazene plasticizer | 0.1–100 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 20°-40° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially precuring in a closed mold for about 6-30 minutes at 200°-250° F., followed by free expansion for 30-60 minutes at 300°-350° F. In the alternative, the foaming may be accomplished by heating the foamable mass for 30-60 minutes at 300°-350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the relative amounts and the Young's modulus of the elastomeric and nonelastomeric polymers employed in the foam formulation. As indicated, inert, reinforcing or other fillers such as alumina trihydrate, hydrated silicas or calcium carbonate can be added to the foams and the presence of these and other conventional additives should in no way be construed as falling outside the scope of this invention.

Also, as mentioned above, the compositions of this invention can be crosslinked at moderate temperatures by conventional free radical and/or sulfur curing techniques when minor amounts of unsaturated groups W are present in the copolymer backbone. The ability of these compositions to be cured at temperatures below about 350° F. makes them particularly useful as potting and encapsulation compounds, sealants, coatings and the like. These materials are also useful for preparing crosslinked foams which exhibit significantly increased tensile strengths over uncured foams. These compositions are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

Preparation of $[(NPCl_2]_n$ 250 parts of hexachlorocyclotriphosphazene, previously recrystallized from n-heptane, were degassed and sealed in a suitable, thickwalled reaction vessel at $10^{-2}$ Torr and heated to 250° C. for 10 hours. Polymerization was terminated when the contents of the vessel had just ceased to flow when the vessel was inverted. Termination was effected by cooling the vessel to room temperature. The resulting polymeric mixture was then dissolved in toluene to form an anhydrous solution.

EXAMPLE 2 Preparation of

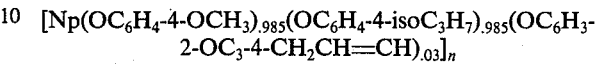

To the anhydrous toluene solution of poly(dichlorophosphazene) formed in Example 1, containing 3.72 equivalents of poly(dichlorophosphazene) was added an anhydrous diglyme-benzene solution of 1.83 equivalents of $NaOC_6H_4$-4-$OCH_3$, 183 equivalents of $NaOC_6H;hd\ 4$-4-$isoC_3H_7$, and 0.15 equivalents of $NaOC_6H_4$-2-$OCH_3$-4-$CH_2CH=CH_2$ at a temperature of 95° C., with constant stirring. After the addition, benzene was distilled from the reaction mixture until a temperature of 115°-116° C. was attained. The reaction was then heated at reflux for 50-65 hours. At the end of this time, the terpolymer was precipitated by pouring the reaction mixture into a large excess of methyl alcohol. The polymer was stirred in methyl alcohol for 24 hours. Next, it was added to a large excess of water and stirred for an additional 24 hours. The resulting product was produced in 43% yield. The product was soluble in benzene, toluene, tetrahydrofuran, and dimethylformamide. The terpolymer mixture was cast from tetahydrofuran. The film was flexible, did not burn, and was water repellant.

EXAMPLE 3

Preparation of

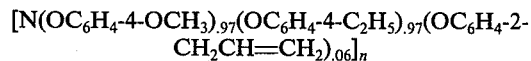

The anhydrous toluene solution of poly(dichlorophosphazene) formed in Example 1, containing 1.86 equivalents of poly(dichlorophosphazene), was added to an anhydrous diglyme-benzene solution of 0.90 equivalents of $NaOC_6H_4$-4-$OCH_3$, 0.90 equivalents of $NaOC_6H_4$-4-$C_2H_5$, and 0.084 equivalents of $NaOCH_6H_4$-2-$CH_2CH=CH_2$ at a temperature of 95° C. with constant stirring. After the addition, benzene was distilled from the reaction mixture until a temperature of 115°-116° C. was attained. The reaction was then heated at reflux for 50-65 hours. At the end of this time the terpolymer was precipitated by pouring the reaction mixture into an excess of methyl alcohol. The polymer was stirred in the methyl alcohol for 24 hours. Next, it was added to a large excess of water and stirred for an additional 24 hours. The resulting product was an off-white elastomer prepared in 51% yield. The terpolymer mixture was then cast to a tough, transparent film from solution in tetrahydrofuran. The film was flexible, did not burn, and was water repellant.

EXAMPLE 4

Preparation of

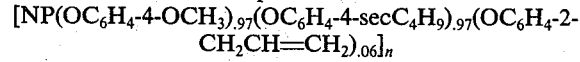

The procedure of Example 3 was followed, except that 1.84 equivalents of poly(dichlorophosphazene) were added to 0.89 equivalents of $NaOC_6H_4$-4-$OCH_3$, 0.89 equivalents of $NaOC_6H_4$-4-sec$C_4H_9$, and 0.077 equivalents of $NaOC_6H_4$-2-$CH_2CH=CH_2$. The resulting product (33 percent yield) was a tan elastomer. The terpolymer was soluble in benzene, tetrahydrofuran and dimethylformamide. The terpolymer mixture was then cast to a flexible film from a solution in tetrahydrofuran. The film did not burn, and was water repellant.

EXAMPLE 5

Preparation of $[NP(OC_6H_4\text{-4-}OCH_3)_{.97}(OC_6H_4\text{-4-}Cl)_{.97}(OC_6H_4\text{-2-}CH_2CH=CH_2)_{.06}]_n$ The procedure of Example 3 was followed, except that 0.84 equivalents of poly(dichlorophosphazene) were added to 0.41 equivalents of $NaOC_6H_4$-4-$OCH_3$, 0.41 equivalents of $NaOC_6H_4$-4-Cl, and 0.03 equivalents of $NaOC_6H_4$-2-$CH_3CH=CH$. The resulting product (41 percent yield) was a colorless plastic. The terpolymer was soluble in benzene, tetrahydrofuran and dimethylformamide. The terpolymer mixture was then cast to a flexible film from a solution in tetrahydrofuran. The film did not burn, and was water repellant.

EXAMPLE 6

Preparation of $[NP(OC_6H_5)_{.64}(OC_6H_4\text{-4-}OCH_3)_{.64}(OC_6H_4\text{-4-t-}C_4H_9)_{.64}(OC_6H_4\text{-2-}OCH_3\text{-4-}CH_2CH=CH_2)_{.08}]_n$ The procedure of Example 3 was followed, except that 1.84 equivalents of poly(dichlorophosphazene) was added to 0.59 equivalents of $NaOC_6H_5$, 0.59 equivalents of $NaOC_6H_4$-4-$OCH_3$, 0.59 equivalents of $NaOC_6H_4$-4-tert $C_4H_9$, and 0.10 equivalents of $NaOC_6H_3$-2-$OCH_3$-4-$CH_2CH=CH_2$. The resulting product (36 percent yield) was a colorless elastomer. The tetrapolymer was soluble in benzene, tetrahydrofuran and dimethylformamide. The tetrapolymer mixture was then cast to flexible film from a solution in tetrahydrofuran. The film did not burn, and was water repellant.

EXAMPLE 7

Preparation of $[NP(OC_6H_4\text{-4-}O\text{-n}C_4H_9)_{.90}(OC_6H_4\text{-4-tert}C_4H_9)_{.90}(OC_6H_4\text{-2-}CH_2CH=CH_2)_{.10}]_n$ The procedure of Example 3 was followed except that 1.86 equivalents of poly(dichlorophosphazene) were added to 0.88 equivalents of $NaOC_6H_4$-4-O-n$C_4H_9$, 0.88 equivalents of $NaOC_6H_4$-4-tert$C_4H_9$, and 0.13 equivalents of $NaOC_6H_4$-2-$CH_2CH=CH_2$. The resulting product (38 percent yield) was a colorless plastic. The terpolymer was soluble in benzene, tetrahydrofuran and dimethylformamide. The terpolymer mixture was then cast to a tough, flexible film from a solution in tetrahydrofuran. The film did not burn, and was water repellant.

EXAMPLE 8

Preparation of $[NP(OC_6H_4\text{-4}OCH_3)_{.90}(OC_6H_4\text{-4-}C_2H_5)_{.90}(OC_6H_3\text{-2-}OCH_3\text{-4-}CH_2CH=CH_2)_{.20}]_n$ The procedure of Example 3 was followed, except that 1.86 equivalents of poly(dichlorophosphazene) were added to 0.84 equivalents of $NaOC_6H_4$-$OCH_3$, 0.84 equivalents of $NaOC_6H_4$-4-$C_2H_5$, and 0.25 equivalents of $NaOC_6H_3$-2-$OCH_3$-4-$CH_2CH=CH_2$. The resulting product (43 percent yield) was a dark tan elastomer. The terpolymer was soluble in benzene, tetrahydrofuran and dimethylformamide. The terpolymer mixture was then cast to a rubbery film from a solution in tetrahydrofuran. The film did not burn, and was water repellant.

EXAMPLE 9

Preparation of $[NP(OC_6H_4\text{-4-}OCH_3)(OC_6H_3\text{-2-}OCH_3\text{-4-}CH_2CH=CH_2)]_n$ The procedure of Example 3 was followed, except that 1.86 equivalents of poly(dichlorophosphazene) were added to 1.11 equivalents of $NaOC_6H_4$-4-$OCH_3$ and 1.11 equivalents of $NaOC_6$Hhd 3-2-$OCH_3$-4-$CH_2CH=CH_2$. The resulting product (35 percent yield) was a colorless elastomer. The copolymer was soluble in benzene, tetrahydrofuran, and dimethylformamide. The terpolymer mixture was then cast to a flexible film from a solution in tetrahydrofuran. The film did not burn, and was water repellant.

In the preparation of curable phosphazene foams herein, the polymer and other ingredients were blended on a two-roll research mill with one roll at 120°–140° F. and the other at ambient conditions. The mixture was milled for at least 15 minutes to insure homogeneous blending. The unexpanded blend was then precured in a press for one minute at a temperature of 200° F. and a pressure of 2000 psi. The pad was then cured at 180° F. for 120 minutes. The resultant material was free expanded in a circulating air oven for 20 minutes at 250° F. and 20 minutes at 325° F.

The following Masterbatch formulation was used with the above procedure to prepare examples illustrative of sulfur-cured aryloxyphosphazene foams:

|  | Parts by Weight |
|---|---|
| Polyphosphazene | 100 |
| Alumina trihydrate | 125 |
| 1,1'-azobisformamide | 20 |
| Oil-treated urea | 5 |
| Zinc stearate | 10 |
| Magnesium oxide dispersion | 5 |
| Titanium dioxide | 8 |
| Sulfur | 2 |
| Zinc dimethyldithiocarbamate | 1.5 |
| N,N'-dibutylthiourea | 0.4 |
| Tellurium diethyldithiocarbamate | 0.4 |

EXAMPLE 10

Using the formulation and method above and with $[NP(OC_6H_4\text{-4-}OCH_3)_{0.97}(OC_6H_4\text{-4-}C_2H_5)_{0.97}(OC_6H_3\text{-2-}OCH_3\text{-4-}CH_2CH=CH_2)_{0.06}]_n$, the polymer prepared in Example 3, a light tan, flexible foam was formed. $Dm(corr) = 116$; $SV/g = 7$. O.I. $= 50.0$. Density $= 22.9$ lb/ft$^3$.

EXAMPLE 11

When 50 parts of phosphazene plasticizer, $[NP(OC_6H_4\text{-4-}OCH_3)(OC_6H_4\text{-4-sec}C_4H_9)]_3$, was added to the ingredients in Example 10 and the resulting mix was foamed, a soft, flexible, resilient, light beige foam sponge was formed. $Dm(corr) = 95$. $SV/g = 17$. O.I. $= 43.9$. Density $= 6.6$ lb/ft$^3$.

EXAMPLE 12

Using the formulation and method above and with the polymer prepared according to Example 4,

[NP(OC$_6$H$_4$-4-OCH$_3$)$_{0.97}$(OC$_6$H$_4$-4-secC$_4$H$_9$)$_{0.97}$(OC$_6$H$_4$-2-CH$_2$CH=CH$_2$)$_{0.06}$]$_n$, a flexible, fairly resilient, dark cream-colored foam pad was formed. D$m$(corr) = 178. SV/$g$ = 7. O.I. = 43.5. Density = 68.7 lb/ft$^3$.

EXAMPLE 13

Using the formulation and method above and with the polymer prepared according to Example 6, [NP(OC$_6$H$_5$)$_{0.64}$(OC$_6$H$_4$-4-OCH$_3$)$_{0.64}$ (OC$_6$H$_4$-4-tC$_4$H$_9$)$_{0.64}$(OC$_6$H$_3$-2-OCH$_3$-4-CH$_2$CH=CH$_2$)$_{0.08}$]$_n$, an expanded, light beige pad was formed. The foam was bendable, but stiff and somewhat resilient. D$m$(corr) = 84. SV/$g$ = 10. O.I. = 42.5. Density = 9.2 lb/ft$^3$.

EXAMPLE 14

When 50 parts of phosphazene plasticizer, [NP(OC$_6$H$_4$-4-OCH$_3$)(OC$_6$H$_4$-4-secC$_4$H$_9$)]$_3$, was added to the ingredients in Example 13, and the resulting mix was foamed, an extremely well-expanded, very soft, flexible, light tan foam sponge was formed. D$m$(corr) = 97. SV/$g$ = 16. O.I. = 37.9. Density = 6.2 lb/ft$^3$.

EXAMPLE 15

Using the formulation and method above and with the polymer prepared according to Example 8, [NP(OC$_6$H$_4$-4-OCH$_3$)$_{0.90}$(OC$_6$H$_4$-4-C$_2$H$_5$)$_{0.90}$(OC$_6$H$_4$-2-OCH$_3$-4-CH$_2$CH=CH$_2$)$_{0.20}$]$_n$, a large, well-expanded, soft, resilient, flexible, pale brown foam sponge was formed. D$m$(corr) = 51. SV/$g$ = 8. O.I. = 38.3. Density = 7.4 lb/ft$^3$.

EXAMPLE 16

Using the formulation and method above and with the polymer prepared according to Example 9, [NP(OC$_6$H$_4$-4-OCH$_3$)(OC$_6$H$_3$-2-OCH$_3$-4-CH$_2$CH=CH$_2$)]$_n$, a dense, fairly stiff, grayish-tan expanded pad was obtained. D$m$(corr) = 268. SV/$g$ = 11. O.I. = 60.3. Density = 55.0 lb/ft$^3$.

EXAMPLE 17

Using the formulation and method above and with 100 parts of sulfur-curable, phosphazine polymer, [NP(OC$_6$H$_4$-4-OCH$_3$)$_{0.97}$(OC$_6$H$_4$-4-isoC$_3$H$_7$)$_{0.97}$(OC$_6$H$_4$-4-CH$_2$CH=CH$_2$)$_{0.06}$]$_n$, a well-expanded, flexible, somewhat resilient, pale cream-colored foam sponge was formed. D$m$(corr) = 226. SV/$g$ = 20. O.I. = 42.5. Density = 7.1 lb/ft$^3$.

EXAMPLE 18

Using the formulation and method above and with 100 parts of sulfur-curable phosphazene polymer, [NP(OC$_6$H$_4$-4-OC$_4$H$_9$)$_{0.95}$(OC$_6$H$_4$-4-tC$_4$H$_9$)$_{0.95}$(OC$_6$H$_4$-2-CH$_2$CH=CH$_2$)$_{0.10}$]$_n$, a fairly stiff, non-resilient, grayish-brown expanded pad was formed. D$m$(corr) = 168. SV/$g$ = 8. O.I. = 43.3. Density = 50.3 lb/ft$^3$.

What is claimed is:

1. A cured phosphazene copolymer prepared by heating in admixture with a sulfur-type curing agent a copolymer having randomly distributed repeating units represented by the formulas

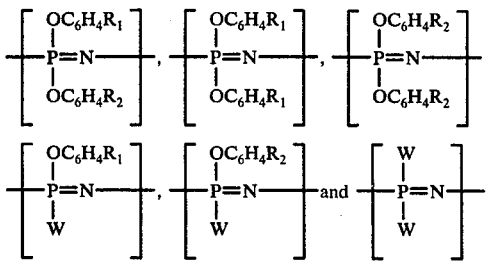

wherein R$_1$ is C$_1$ to C$_{10}$ linear or branched alkoxy, R$_2$ is hydrogen, C$_1$-C$_{10}$ linear or branched alkyl or halogen, and W represents a monovalent radical containing a group capable of a crosslinking chemical reaction at moderate temperatures, said group being attached to a P atom by a —O— linkage.

2. The process of curing the copolymers of claim 1 which comprises heating said copolymers at temperatures ranging from 200° to 350° F. utilizing sulfur-type curing agents.

3. Cured poly (aryloxyphosphazene) copolymers prepared by heating in admixture with a sulfur-type curing agent a copolymer having the general formula

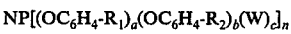

wherein R$_1$ is C$_1$-C$_{10}$ linear or branched alkoxy; R$_2$ is hydrogen, C$_1$-C$_{10}$ linear or branched alkyl or halogen; W represents a monovalent radical containing a group capable of a crosslinking chemical reaction at moderate temperatures, said group being attached to a P atom by a —O—linkage; n is from 20 to 2000, $a$ or $b$ but not $c \geq 0$, and $a+b+c=2$, the ratio of $a{:}b$ from about 1:6 to 6:1, and the ratio of $c{:}(a+b)$ 9:10 to 5:100.

4. The copolymers of claim 3 wherein R$_1$ is OCH$_3$ and W is OC$_6$H$_4$-2-OCH$_3$-4-CH$_2$CH=CH$_2$.

5. The copolymers of claim 3 wherein R$_1$ is OCH$_3$, R$_2$ is t-C$_4$H$_9$ and W is OC$_6$H$_4$-2-CH$_2$CH=CH$_2$.

6. The copolymers of claim 4 wherein the ratio of $c{:}(a+b)$ is from 1:10 to 3:100.

7. The copolymers of claim 5 wherein the ratio of $c{:}(a+b)$ is from 1:10 to 3:100.

* * * * *

UNITED STATES PATENT AND TRADEMARK OFFICE
CERTIFICATE OF CORRECTION

PATENT NO. : 4,107,146
DATED : August 15, 1978
INVENTOR(S) : Ronald L. Dieck et al It is certified that error appears in the above-identified patent and that said Letters Patent are hereby corrected as shown below:

Column 2, line 43, after the formula "$OC_6H_3(R_3)CH=CH_2$", the formula --$OC_6H_4CH_2CH=CH_2$-- was omitted.

Column 4, lines 21 and 22, the word "produces" should read --products--; same column, line 26, the word "temperature" should read --temperatures--.

Column 6, line 11, that portion of the formula which reads "$2-OC_3$" should read --$2-OCH_3$--; same column, line 16, the numeral "183" should read --1.83--; same column, line 17, the formula which reads "$NaOC_6H;hd\ 4-4-isoC_3H_7$" should read --$NaOC_6H_4-4-isoC_3H_7$--; same column, line 45, that portion of the formula which reads "$NaOCH_6$" should read --$NaOC_6$--.

Column 8, line 15, that portion of the formula which reads "$NaOC_6Hhd\ 3-2-OCH_3$" should read --$NaOC_6H_3-2-OCH_3$--.

Column 9, line 42, the word "phosphazine" should read --phosphazene--.

Signed and Sealed this

Sixteenth Day of January 1979

[SEAL]

Attest:

RUTH C. MASON
Attesting Officer

DONALD W. BANNER
Commissioner of Patents and Trademarks